United States Patent
Tanguy et al.

(10) Patent No.: US 8,430,454 B2
(45) Date of Patent: Apr. 30, 2013

(54) ARTICULATION SYSTEM AND VEHICLE SEAT HAVING SUCH AN ARTICULATION SYSTEM

(75) Inventors: Julien Tanguy, St. Georges des Groseillers (FR); Guillaume Gabillard, Cormelles-le-royal (FR)

(73) Assignee: Faurecia Sièges d'Automobile, Nanterre (FR)

( * ) Notice: Subject to any disclaimer, the term of this patent is extended or adjusted under 35 U.S.C. 154(b) by 21 days.

(21) Appl. No.: 12/984,399

(22) Filed: Jan. 4, 2011

(65) Prior Publication Data

US 2011/0169314 A1 Jul. 14, 2011

(30) Foreign Application Priority Data

Jan. 12, 2010 (FR) ...................................... 10 50190

(51) Int. Cl.
*B60N 2/235* (2006.01)
(52) U.S. Cl.
USPC .................................. 297/367 L; 297/367 R
(58) Field of Classification Search ............... 297/367 L, 297/367 R
See application file for complete search history.

(56) References Cited

U.S. PATENT DOCUMENTS

| 5,749,624 | A | * | 5/1998 | Yoshida | 297/367 R |
| 6,007,153 | A | * | 12/1999 | Benoit et al. | 297/378.12 |
| 6,039,400 | A | * | 3/2000 | Yoshida et al. | 297/367 R |
| 6,120,098 | A | * | 9/2000 | Magyar et al. | 297/367 R |
| 6,726,281 | B2 | * | 4/2004 | Baloche | 297/367 R |

FOREIGN PATENT DOCUMENTS

| FR | 2816260 A1 | 5/2002 |
| FR | 2915935 A1 | 11/2008 |
| WO | WO 2008/086598 A1 | 7/2008 |

OTHER PUBLICATIONS

French Search Report from corresponding French Patent Application No. FR 731410 Report Dated Oct. 18, 2010.

* cited by examiner

*Primary Examiner* — David Dunn
*Assistant Examiner* — Timothy J Brindley
(74) *Attorney, Agent, or Firm* — Miller, Matthias & Hull LLP (57) ABSTRACT

Articulation system having two articulations, each comprising two strength members that are able to pivot with respect to one another and are each controlled by a control member. The control members of the two articulations are able to move independently of one another between locking and unlocking positions and are elastically urged towards the locking position. A maneuvering member engages by pressing only in an actuating direction with first and second driving members connected to the respective control members of the first and second articulations and suitable for driving each corresponding control member from the locking position into the unlocking position.

11 Claims, 10 Drawing Sheets

ARTICULATION SYSTEM AND VEHICLE SEAT HAVING SUCH AN ARTICULATION SYSTEM

CROSS-REFERENCE TO RELATED APPLICATIONS

This application claims priority under the Paris Convention to the French Patent Application No. 10 50190, filed on Jan. 12, 2010.

FIELD OF THE DISCLOSURE

1. Field of the Invention

The present invention relates to articulation systems for vehicle seats and to seats having such articulation systems.

2. Background of the Disclosure

More particularly, the invention relates to an articulation system having:
- first and second articulations, each comprising two strength members that are able to pivot with respect to one another and a locking mechanism which has at least one control member that is able to move between a locking position and an unlocking position, the locking mechanism being suitable for locking the two strength members when the control member is in the locking position and for unlocking the two strength members when the control member is in the unlocking position, the control members of the two articulations each being elastically urged towards the locking position,
- a maneuvering member (for example a handle or any other member that is able to be controlled directly or indirectly by a user) that is able to move between a rest position and an actuating position and is suitable for moving the control members of the first and second articulations from the locking position into the unlocking position when said maneuvering member is moved in an actuating direction from the rest position to the actuating position.

Document WO-A-2008/086598 describes an example of such a system, in which the actuating member is integral with a connecting bar which is itself integral with the control member of the first articulation and connected with angular play to the control member of the second articulation. These known systems, where one of the articulations is the master and the other the slave, do not ensure that the locking mechanisms of the two articulations are properly in the rest position when the maneuvering member is not actuated.

Specifically, the control member of one of the articulations could arrive in the rest position before the other does, in which case only one of the articulations is locked, the other articulation remaining unlocked even when the maneuvering member is not actuated.

SUMMARY OF THE DISCLOSURE

The aim of the present invention is in particular to alleviate these drawbacks.

To this end, according to the invention, the control members of the first and second articulations are able to move independently of one another between the locking and unlocking positions,
and the maneuvering member is suitable for pressing against first and second driving members connected to the respective control members of the first and second articulations, only when said maneuvering member is moved in the actuating direction, said first and second driving members being suitable for then driving each corresponding control member from the locking position into the unlocking position, the control member of the first articulation being independent of the second driving member and the control member of the second articulation being independent of the first driving member.

By virtue of these arrangements, the control members of the two articulations can return to their rest positions independently of one another. This ensures that the two articulations are locked properly when the maneuvering member is not actuated, while enabling them to be unlocked jointly by actuating one single maneuvering member without using complex or expensive means.

In various embodiments of the articulation system according to the invention, one and/or another of the following arrangements may optionally be used:
- the rest position of the maneuvering member is suitable for the maneuvering member not to interfere with the first and second driving members in said rest position;
- the maneuvering member is urged towards the rest position by at least one elastic member that is independent of the first and second articulations;
- the control members of the first and second articulations are pivotally mounted about one and the same rotational axis, said control members of the two articulations being positioned so as to pivot in one and the same angular unlocking direction from the locking position as far as the unlocking position, and the system further has a connecting bar rotationally connected to the control member of the first articulation, the connecting bar being able to rotate independently of the control member of the second articulation and being integral with the first driving member, the control member of the second articulation being rotationally connected to the second driving member;
- the connecting bar passes through the control member of the second articulation at the rotational axis, without there being a rotational connection between said connecting bar and the control member of the second articulation;
- the first and second driving members are link rods extending approximately perpendicularly to the rotational axis and juxtaposed on said rotational axis;
- each of the first and second articulations has a tubular connector passing through the control member and secured to said control member by interlocking, the connecting bar being secured to the connector of the first articulation by interlocking and said connecting bar passing through the connector of the second articulation;
- the connector is made of plastic (this thus limiting the possible clicking noises generated by the connecting bar by contact with the connecting piece of the second articulation);
- the connectors of the first and second articulations are identical and each have a central through-passage of polygonal section, the connecting bar having in particular:
    - a first portion having a corresponding polygonal section, which is interlocked in said central passage of the connector of the first articulation with a rotational connection,
    - and a second portion having a smaller section and passing through said central passage in the connector of the second articulation without a rotational connection;

at least the connector of the second articulation has a tubular end piece that protrudes axially from the second articulation and is secured by interlocking to the second driving member;

each of the first and second articulations has a central passage which passes through the two strength members of said articulation, the connector of said articulation having a flange which presses axially against one of the strength members of said articulation and elastic tabs which are clip-fastened onto the other strength member of said articulation.

Moreover, another subject of the invention is a vehicle seat having a seat cushion and a backrest pivotally mounted with respect to the seat cushion by an articulation system as defined hereinabove.

BRIEF DESCRIPTION OF THE DRAWINGS

Further features and advantages of the invention will become apparent from the following description of one of its embodiments, given by way of nonlimiting example, with reference to the attached drawings.

In the drawings.

DETAILED DESCRIPTION OF THE DRAWINGS

In the various figures, the same references designate identical or similar elements.

Figure 1:
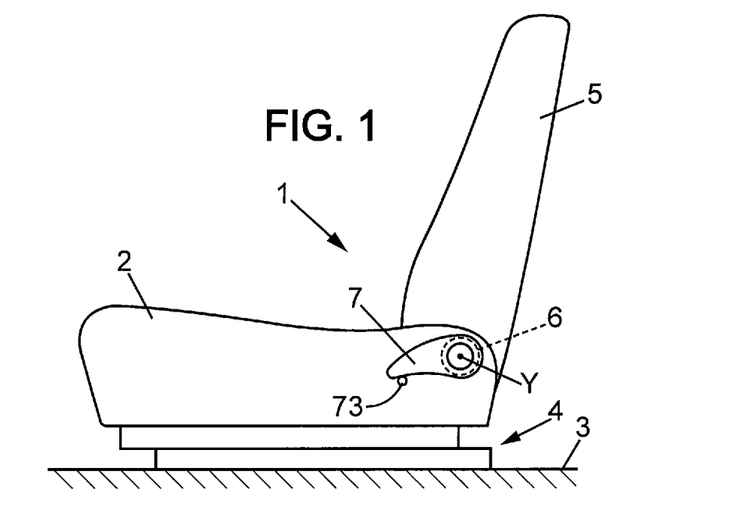
FIG. 1 shows a vehicle seat that can be equipped with an articulation mechanism according to one embodiment of the invention.

FIG. 1 shows a vehicle seat 1, for example a front seat of a motor vehicle, which comprises a seat cushion 2 fixed to the floor 3 of the vehicle, for example by means of longitudinal slide rails 4, and a backrest 5 mounted such that it is able to pivot with respect to the seat cushion 2 about a transverse horizontal rotational axis Y, by means of an articulation system 6 controlled for example by a handle 7 or some other maneuvering member.

Figure 2:
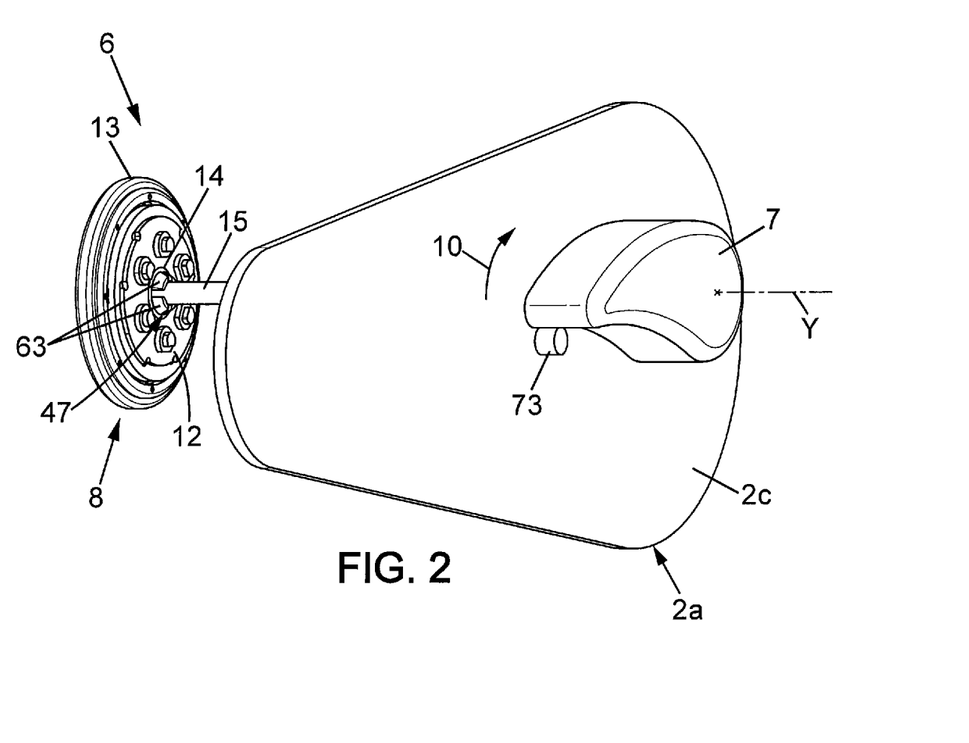
FIGS. 2 and 3 are perspective three-quarter views from the front and the rear, respectively, showing the articulation system for the seat in FIG. 1 and also a part of the structure of the seat cushion of this seat.
Figure 3:
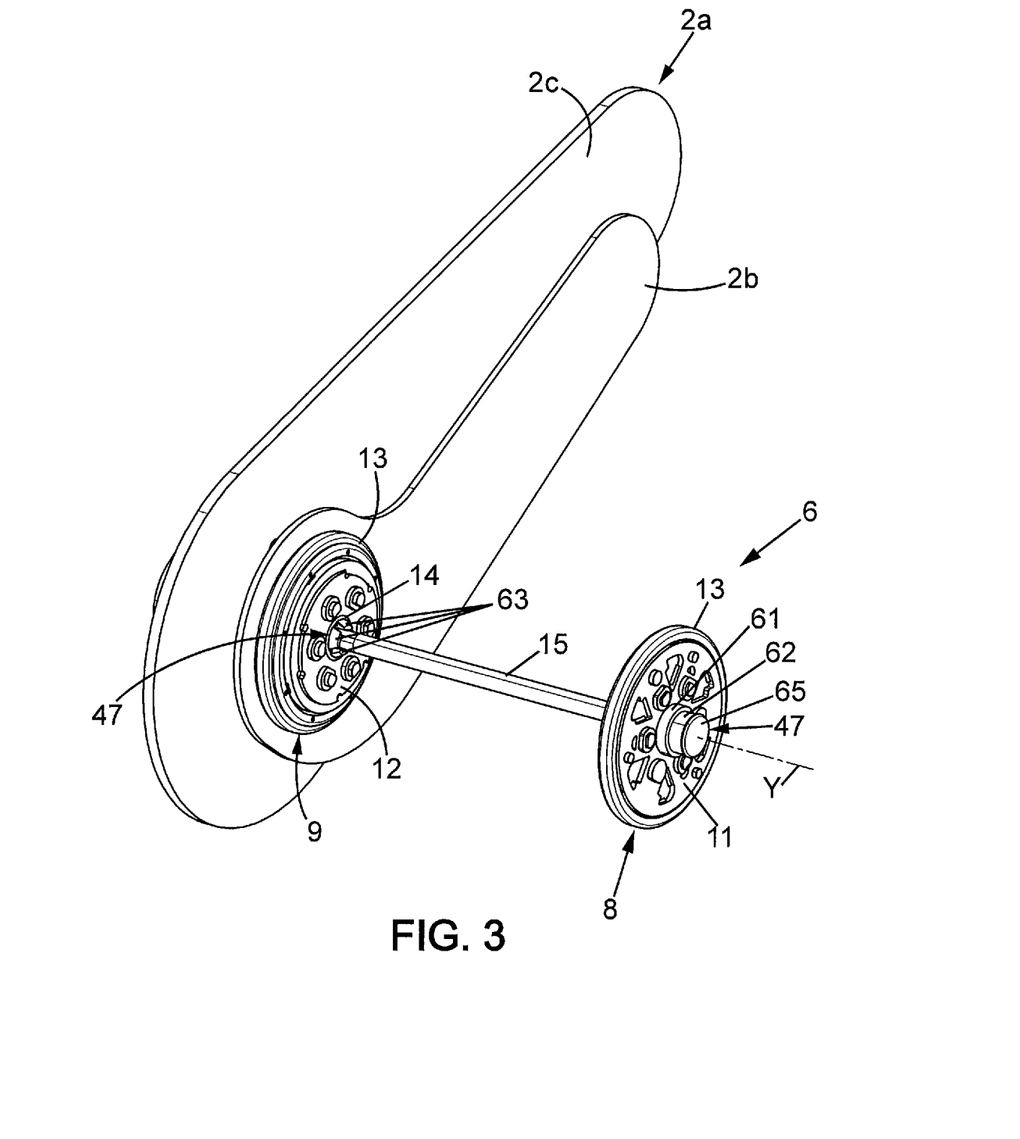

As shown in FIGS. 2 and 3, the articulation system 6 of the seat has first and second articulations 8, 9, symmetrical with respect to one another, which normally immobilize the backrest 5 with respect to the seat cushion 2 while the handle is in the rest position that can be seen in FIGS. 1 and 2 and which can be unlocked simultaneously by pivoting the handle 7 in the angular actuating direction 10 about the axis Y, as will be explained hereinbelow.

Each of the articulations 8, 9 has two strength members 11, 12, one of which is fixed to the seat cushion 2a and the other to the backrest. In the example shown, these two strength members 11, 12 are in the form of metallic plates in the form of vertical disks which extend perpendicularly to the rotational axis Y and which are mounted such that they are able to rotate with respect to one another about the axis Y by mutual interlocking and by means of a crimped metal ring 13, in a manner known per se.

In the example considered here, the plate 11 of each articulation, called the fixed plate, can be fixed for example to a lateral metal plate 2b belonging to the seat cushion 2a and this lateral plate 2b can optionally be covered towards the outside of the seat by a casing 2c, at least on the handle 7 side.

The plates 11, 12 of the two articulations each have a circular central passage 14 passing through them, and a rigid connecting bar 15, which is generally made of metal, is inserted into the central passage 14 of the movable plate 12 of the first articulation 8 (the one which is furthest away from the handle 7) and passes through the central passages of the two plates 11, 12 of the second articulation 9.

Figure 4:
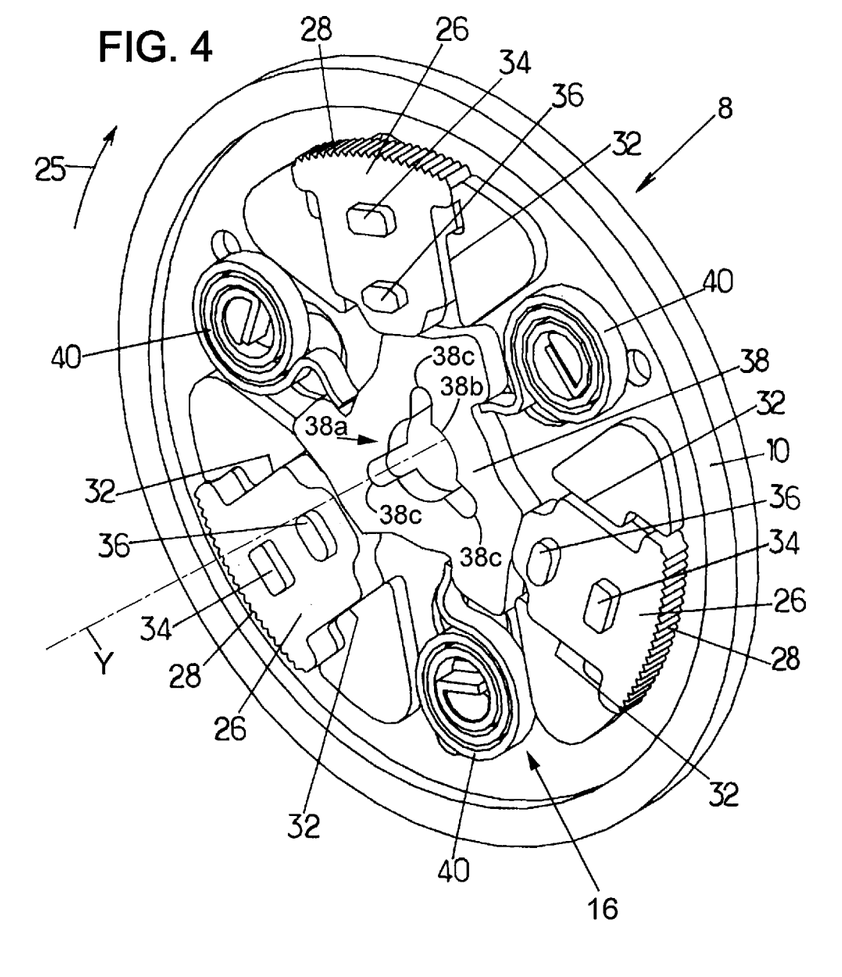
FIG. 4 is a perspective view of the locking mechanism of one of the articulations belonging to the articulation system in FIGS. 2 and 3, FIGS. 5 and 6 are views in vertical section of the two articulations that are part of the articulation system in FIGS. 2 and 3, respectively.
Figure 5:
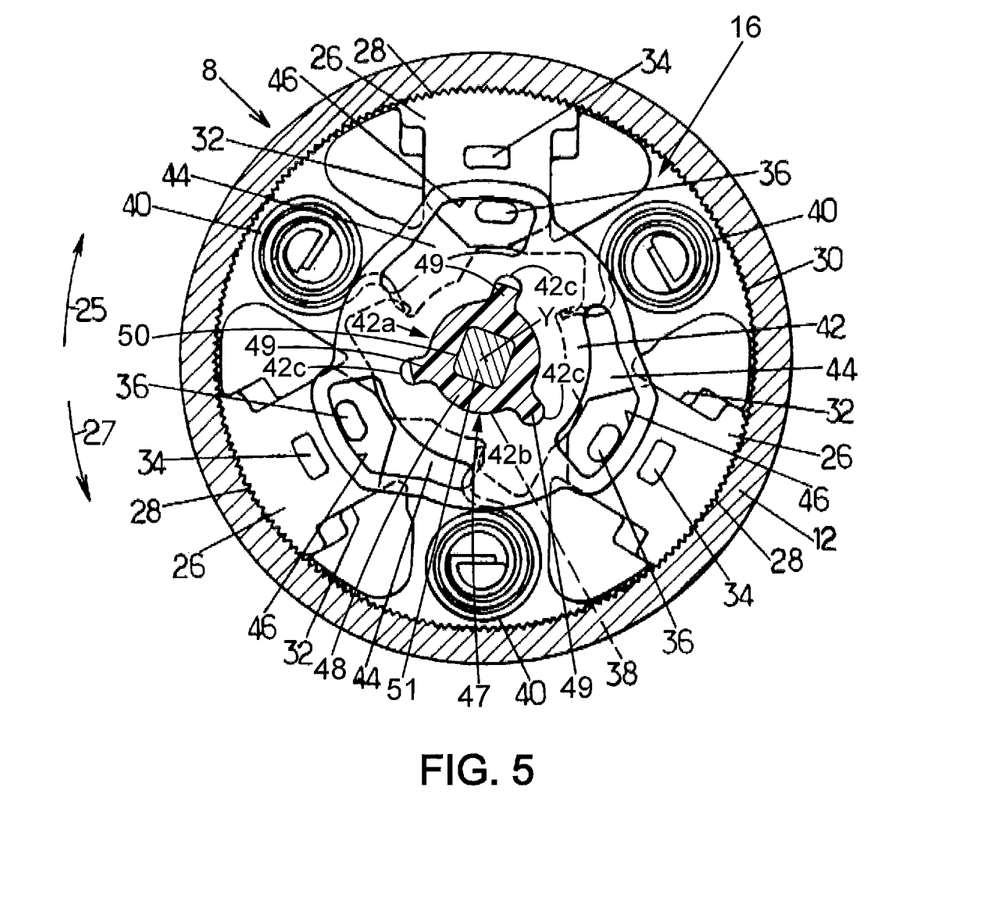

As shown in more detail in FIGS. 4 and 5 in the case of the first articulation 8, each articulation has a locking mechanism 16, which is contained in the housing formed by the plates 11, 12 and is suitable for immobilizing the movable plate 12 with respect to the corresponding fixed plate while the handle 7 is not actuated.

In the example considered here, the locking mechanism 16 of each articulation 8, 9 can have in particular:

three metallic locking blocks 26 which are arranged at 120° with respect to one another and which each have an external toothing 28 suitable for engaging with an internal circular toothing 30 centered on the axis Y and formed in the movable plate 12, each of these blocks being mounted such that it is able to slide radially in a guide 32 which is integral with the fixed plate 11, such that the blocks can be moved between an engagement position, on the one hand, in which the toothing of these blocks is engaged with the toothing of the corresponding movable block in order to block the articulation, and a set-back position, on the other hand, in which the blocks do not engage with the toothing of the movable plate and in which the blocks are as far away as possible from the toothing 30; each block also has two pins 34, 36 which protrude axially towards the movable plate, a control member consisting of a metal cam 38 which is mounted such that it is able to rotate about the axis Y and which is controlled by the handle 7, this cam 38 controlling the sliding of the blocks 26, springs 40 which are mounted on the fixed plate 11 and which urge the cam 38 towards a locking position in which the latter puts the blocks into their engaging position, said cam being able to pivot in the angular direction 25 until it is in an unlocking position enabling the blocks to slide towards their set-back position, thereby unblocking the corresponding articulation, and a control mask formed by a rigid metal sheet 42 which is connected rigidly to the cam 38 and extends radially between said cam and the movable plate, partially covering the blocks, this sheet having three cutouts 44, into which the pins 36 of the blocks are engaged, each of these pins engaging with a cam edge 46 that delimits the corresponding cutout radially towards the outside and is shaped to engage with the corresponding pin 36 so as to move the corresponding block 26 radially towards the inside when the cam 38 rotates in the angular direction 25.

In the example shown in FIGS. 4 and 5, the cam 38 has a through-passage 38a which comprises:

an approximately circular central portion 38b centered on the rotational axis Y, and radial slots 38c, of which there are in this case 3, extending at 120° with respect to one another starting from the central portion 38b.

Similarly, the control mask 42 has a through-passage 42a which comprises:

a circular central portion 42b centered on the rotational axis Y, having the same diameter as the central portion 38b of the through-passage in the cam, and radial slots 42c, of which there are in this case 3, which are distributed at 120° with respect to one another and which are arranged in a manner corresponding to the radial slots 38c of the through-passage in the cam.

Figure 7:
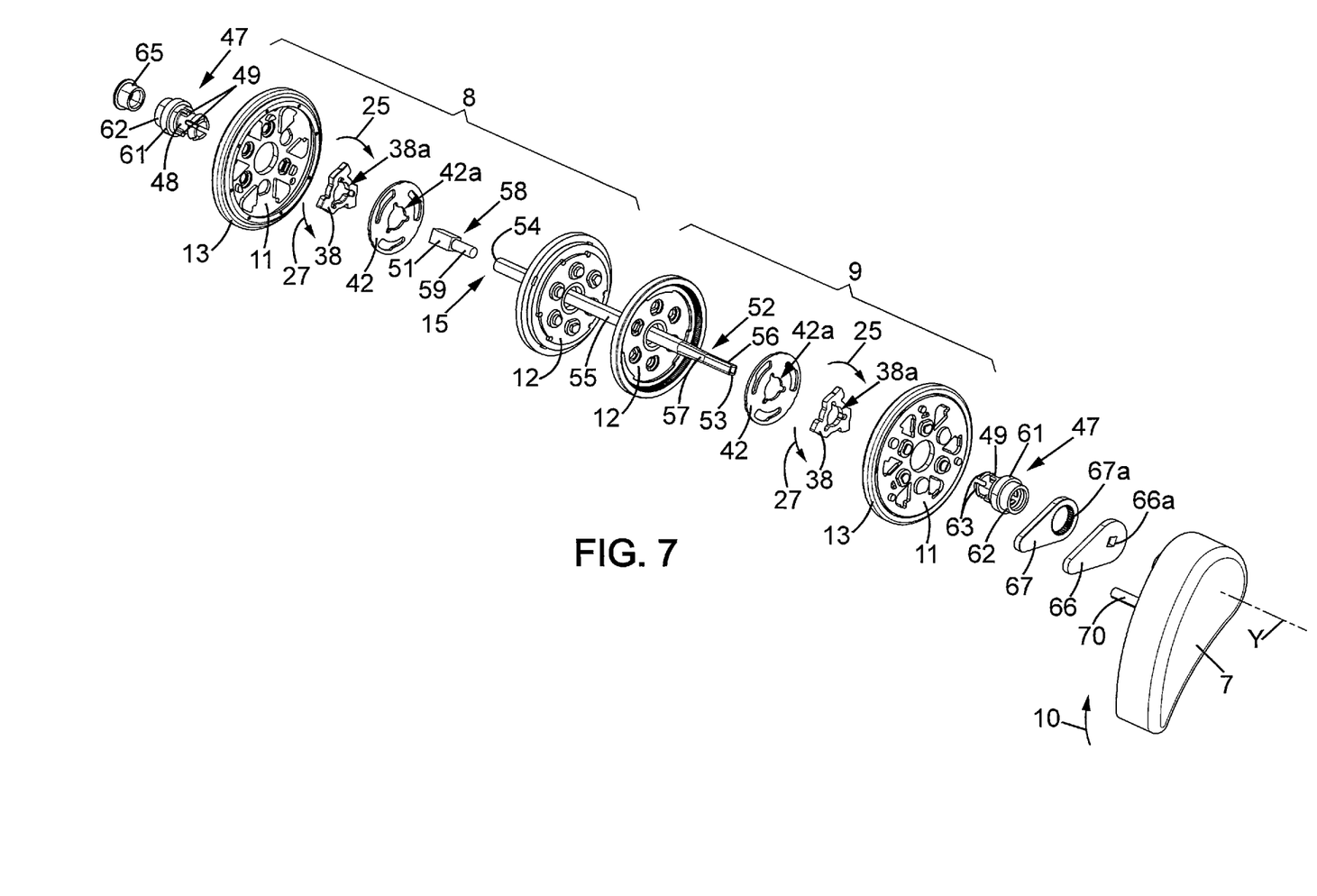
FIG. 7 is an exploded perspective view of the articulation system in FIGS. 2 and 3.
Figure 8:
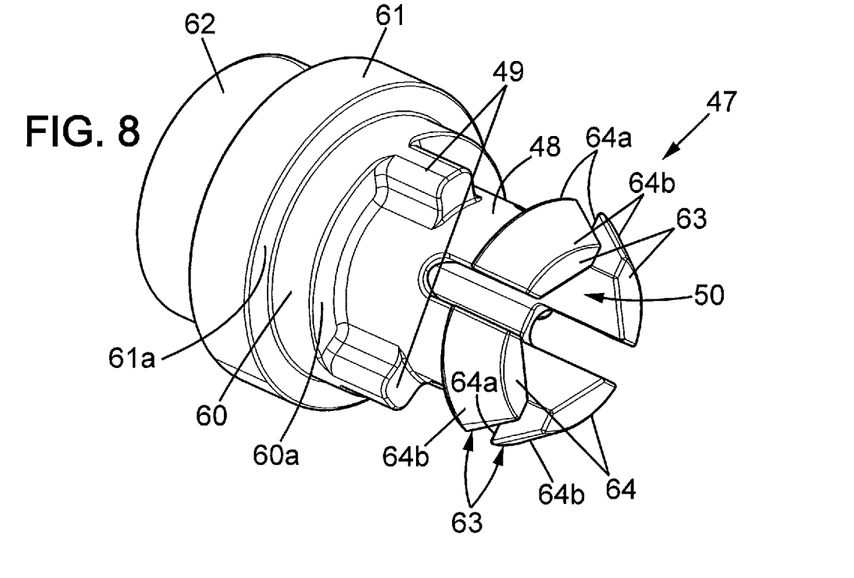
FIG. 8 is a perspective view of a plastic connector inserted into the two articulations of the articulation system in FIG. 7.
Figure 9:
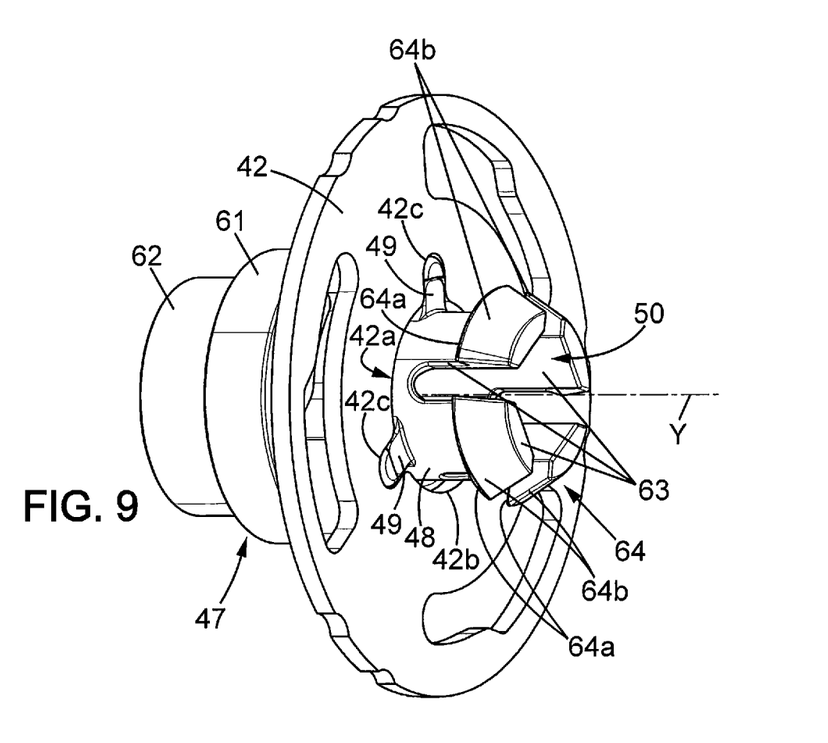
FIG. 9 is a perspective view showing the interlocking of the connector in FIG. 8 with the control member of one of the articulations.
Figure 10:
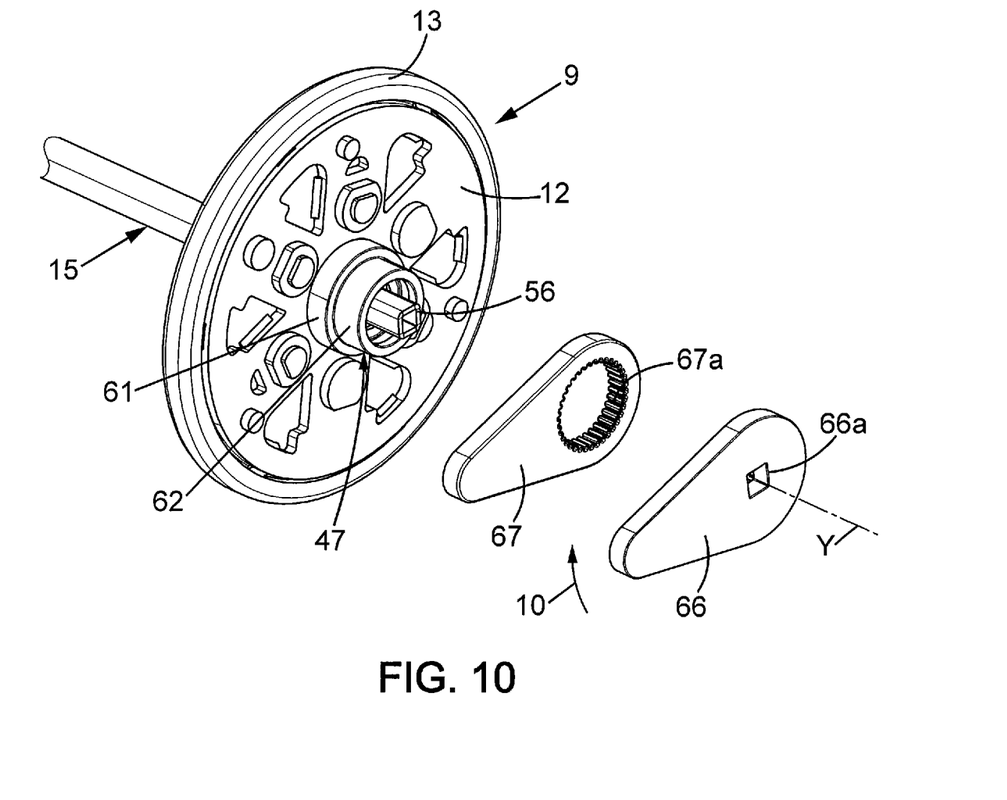
FIG. 10 is a detail view showing that part of the articulation system in FIG. 7 which is closest to the actuating handle.

A connector 47, which can be seen in particular in FIGS. 5 to 9, is furthermore interlocked on the axis Y with the through-passages 14 in the plates 11, 12 and with the through-passages 38a, 42a in the cam and the control mask of each articulation. This connector, which may be for example molded from plastic, has a generally tubular form and has a circular central part 48 having an outside diameter that corresponds approximately to the inside diameter of the central portions 38b, 42b of the through-passages in the cam and the control mask, such that this central portion 48 is interlocked more or less without play with these passages 38b, 42b. In addition, the central portion 48 of each connector 47 has radial ribs 49, of which there are in this case 3, which are arranged at 120° with respect to one another and which interlock in each case with the radial slots 38c in the corresponding cam 38 and with the radial slots 42c in the corresponding control mask, as can be seen in FIGS. 5 and 9.

Each connector 47 delimits to the inside a central through-passage 50, which may advantageously have a polygonal section, in particular a square section (optionally with rounded corners), which can be clearly seen in FIGS. 5 and 8.

Moreover, the connecting bar 15 carries along a free end 51, opposite the handle 7, which has a section corresponding to the through-passage 50 in the connectors 47 (in this case a square section) and which is interlocked with the through-passage 50 in the connector 47 of the first articulation 8, thus securing the connecting bar 15 in terms of rotation to this connector 47 and to the cam 38 and the control mask 42 of this first articulation.

As shown in FIG. 7, the connecting bar 15 can optionally be produced in two pieces, namely a main tubular part 52 and an inserted piece 58.

The main tubular part 52 extends longitudinally along the axis Y between a proximal end 53 close to the handle 7 and a distal end 54 at a distance from the handle 7, this main part 52 having:

a running part 55 of circular section, the external contour of which is inscribed in the contour of the free end 51 of the connecting bar, a proximal part 56 close to the proximal end 53, which has a polygonal section inscribed in the circular section of the running part 55, and in particular a square section (optionally having rounded corners) inscribed in the circular section of the running part 55, and an intermediate part 57 which forms the junction between the running part 55 and the proximal part 56.

The inserted piece 58 includes the free end 51, and also a tenon 59 which is interlocked by force with the tubular running part 55, at the distal end 54, such that the inserted piece 58 is entirely secured to the main part 52 of the connecting bar.

Figure 6:
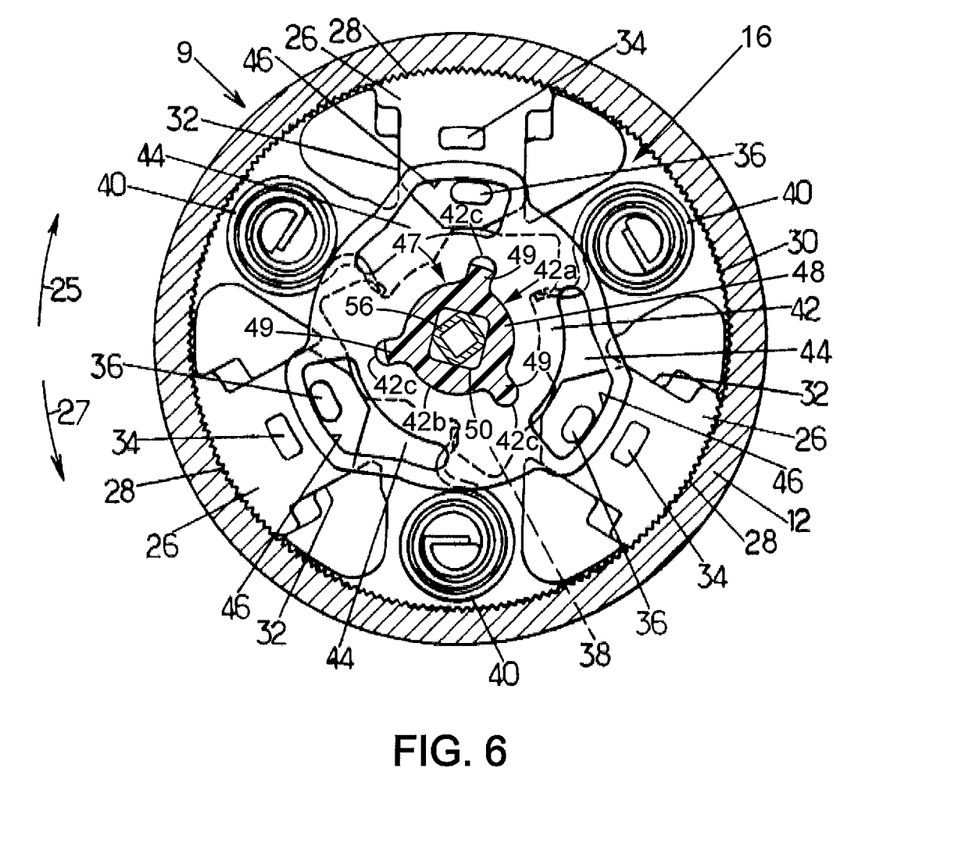

As shown in FIG. 6, the through-passage 50 in the connector 47 of the second articulation 9 has the proximal part 56 of the connecting bar passing through it, the section of said connecting bar being inscribed in a circle which is itself inscribed in the square section of the passage 50, such that the connecting bar is not secured in terms of rotation to this connector 47 or to the cam 38 and the control member 42 of this second articulation.

The running part 55 of the connecting bar 15 could nevertheless optionally be interlocked approximately without play in the through-hole 50 in the connector 47 of the second articulation 9, such that possible clicking noises between the connecting bar 15 and this connector 47 are avoided.

Moreover, as shown in FIGS. 7 and 8, each connector 47 may have, on one side of its central part 48, a widened circular part 60 which delimits a shoulder 60a towards the central part 48 and which is connected to the ribs 49 of the connector 47. This widened circular part 60 interlocks with the inside of the through-passage 14 in the fixed plate 11 of the corresponding articulation, the shoulder 60a bearing against the cam 38 of this articulation. The widened circular part 60 is extended towards the outside of the articulation by a flange 61 having a diameter greater than the widened circular part 60, said flange for its part delimiting a shoulder 61a that bears against the external face of the fixed plate 11. Finally, each connector 47 may be extended towards the outside of the corresponding articulation, beyond the flange 61, by a tubular end piece 62, the utility of which will be seen hereinbelow.

Opposite the tubular end piece 62, the central part 48 of each connector 47 is extended axially along the axis Y by elastic tabs 63 which each extend as far as a free end provided with clip-fastening hooks 64 which each have a stop face 64a oriented axially towards the central part 48 of the connector and a beveled face 64b extending at an angle radially towards the inside opposite the central part 48. The elastic tabs 63 are clip-fastened into the central passage 14 of the movable plate 12 of the corresponding articulation, the stop faces 64a of the clip-fastening hooks bearing against the external face of this movable plate 12.

As shown in FIGS. 3 and 7, a plastic stopper 65 can also be interlocked with the inside of the tubular end piece 62 of the connector 47 of the first articulation 8.

Moreover, the tubular end piece 62 of the connector 47 of the second articulation 9 passes through the lateral plate 2b of the seat cushion, similarly to the proximal part 56 of the connecting bar 15. This proximal part 56, having a square or some other section, is secured in terms of rotation to a first driving member 66, which may for example be in the form of a metal link rod extending in a longitudinal direction arranged radially with respect to the axis Y. This link rod is provided with a through-hole 66a having the same section as the external section of the proximal part 56 of the connecting bar, said through-hole 66a being interlocked without play with said proximal part 56. This first driving member 66 is located for example between the lateral plate 2b of the backrest and the casing 2c.

In addition, the articulation system 6 further has a second driving member 67, which may for example be in the form of a metal link rod having a general form similar to the first driving member 66 and extending in a longitudinal direction arranged radially with respect to the axis Y. This second driving member 67 may have an internally serrated circular through-hole 67a which is interlocked in a clamped manner around the tubular end piece 62 of the connector 47 of the second articulation 9. The second driving member is thus secured to the connector 47, the cam 38 and the control mask 42 of the second articulation 9.

Figure 11:
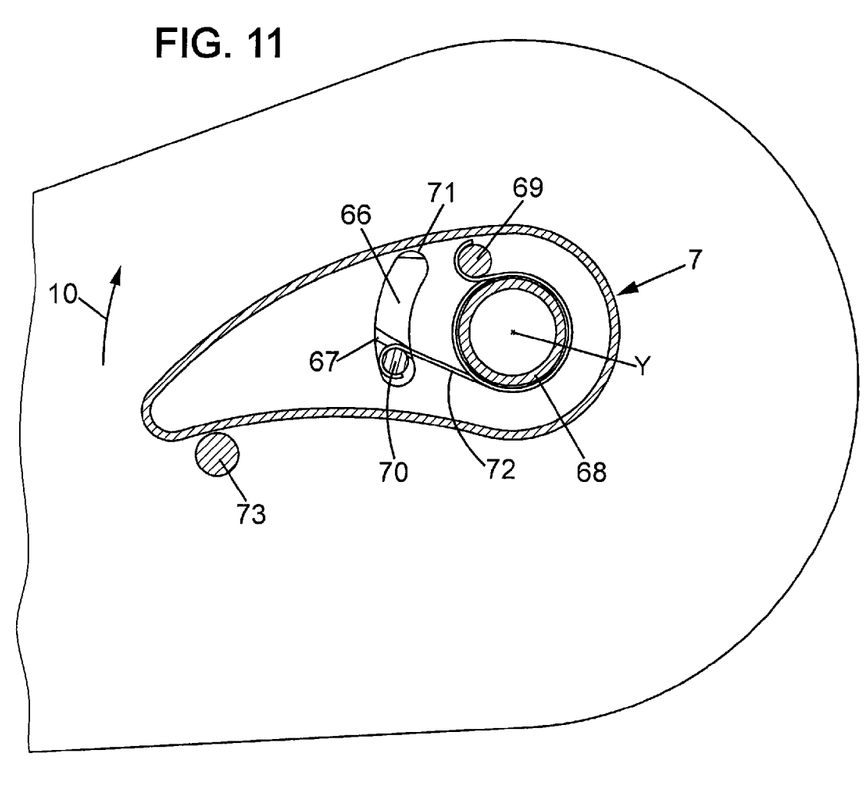
FIG. 11 is a view in vertical section of the actuating handle of the articulation system.

As shown in FIG. 11, the handle 7 has a dedicated hub 68, which is mounted such that it is able to rotate about the axis Y on the casing 2c and which is independent of the connecting bar 15. Said handle 7 is elastically urged towards its rest position, in the opposite direction to the angular actuating direction 10, by a spring 72. This spring may for example be in the form of an elastic metal wire wound around the hub 68 and ending in two end branches, one being supported on a fixed point, for example a pin 69 belonging to the casing 2c, and the other on a point integral with the handle 7, for example an abutment finger 70 extending parallel to the axis Y. The rest position of the handle 70 can be defined by a fixed abutment, for example a pin 73 integral with the casing 2c, against which abutment the handle 7 abuts when it is urged elastically by the spring 72.

Figure 12:
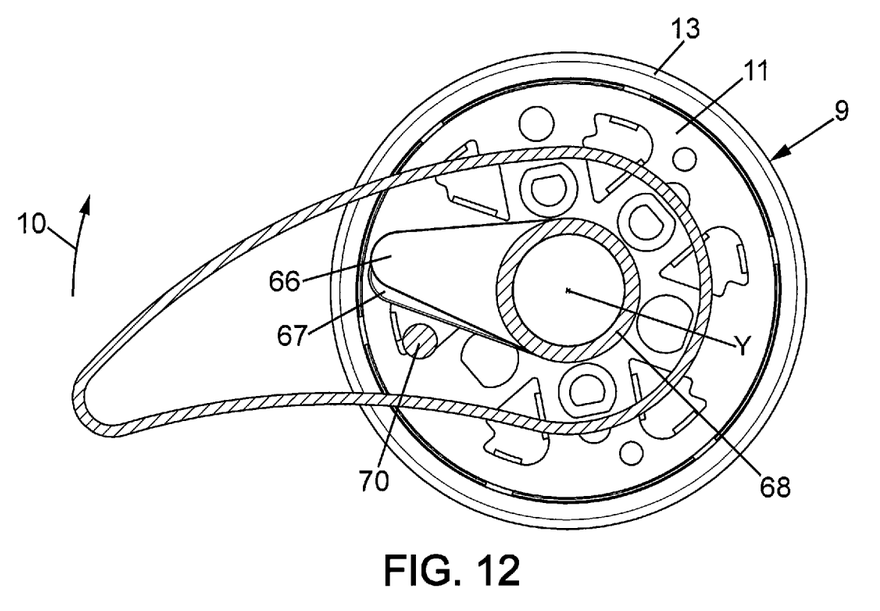
FIG. 12 is a view similar to FIG. 10, in which the lateral plate of the seat cushion structure and the lateral casing of this seat cushion and also the return spring of the actuating handle have been concealed to provide greater clarity.

The abutment finger 70 of the handle 7 can for example pass through an arcuate slot 71 centered on the rotational axis Y and formed by the casing 2c, such that the abutment finger 70 extends until it is close to the lateral plate 2b of the seat cushion structure, under the link rods 66, 67, as can be seen in FIG. 12.

In the rest position of the handle 7, the abutment finger 70 is not in contact with the link rods 66, 67, such that it prevents none of the cams 38 of the articulations 8, 9 from being held in a locking position by the internal springs 40 in each of the articulations 8, 9. The locking position of each of the cams 38 of the articulations 8, 9 may furthermore correspond to slightly different angular positions of the link rods 66, 67, as is shown in FIG. 12.

Figure 13:
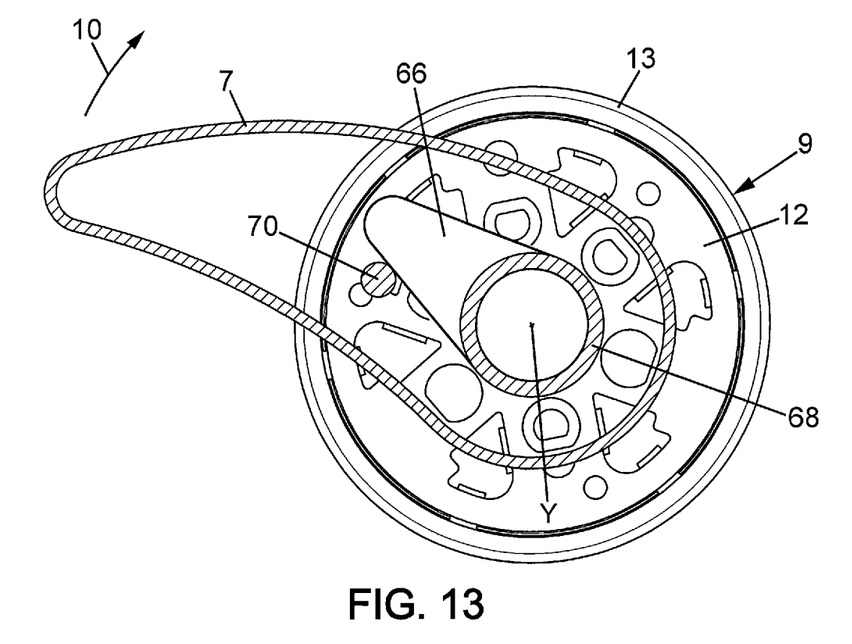
FIG. 13 is a view similar to FIG. 11, showing the articulation system during the actuation of the handle.

When a user actuates the handle 7 in the angular actuating direction 10, as shown in FIG. 13, the abutment finger 70 bears against the lower edge of the link rods 66, 67 and drives them in the angular actuating direction 10, which also corresponds to the angular unlocking direction 25 of the two articulations, thereby enabling the locking mechanisms 16 of the two articulations 8, 9 to be unlocked when the handle arrives in the actuating position that can be seen in FIG. 13.

Figure 14:
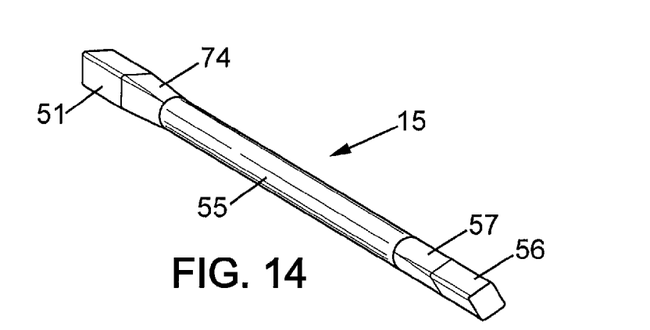
FIG. 14 is a perspective view of a variant of the connecting bar, it being possible to use said variant instead of that of the embodiment in FIGS. 1 to 13.

FIG. 14 shows a variant of the connecting bar 15, which differs from the connecting bar 15 described hereinabove only in that it is made in one piece, for example a forged piece of metal, the free end 51 of the connecting bar being in this case connected to the running part 55 of the connecting bar by a transition section 74 of said connecting bar.

The invention claimed is:

1. An articulation system, comprising:
   first and second articulations, each comprising two strength members that are able to pivot with respect to one another and a locking mechanism which has at least one control member that is able to move between a locking position and an unlocking position, the locking mechanism locking the two strength members when the control member is in the locking position and for unlocking the two strength members when the control member is in the unlocking position, the control members of the two articulations each being elastically urged towards the locking position, and a maneuvering member that is able to move between a rest position and an actuating position and is suitable for moving the control members of the first and second articulations from the locking position into the unlocking position when said maneuvering member is moved in an actuating direction from the rest position to the actuating position, wherein the control members of the first and second articulations are able to move independently of one another between the locking and unlocking positions, and wherein the maneuvering member is suitable for pressing against first and second driving members operatively associated with and connected to the respective control members of the first and second articulations, only when said maneuvering member is moved in the actuating direction, said first and second driving members being suitable for then driving each corresponding control member from the locking position into the unlocking position, the control member of the first articulation being independent of the second driving member and the control member of the second articulation being independent of the first driving member;

wherein the control members of the first and second articulations are pivotally mounted about one and the same rotational axis, said control members of the two articulations being positioned so as to pivot in one and the same angular unlocking direction from the locking position as far as the unlocking position, and the system further has a connecting bar rotationally connected to the control member of the first articulation, the connecting bar being able to rotate independently of the control member of the second articulation and being integral with the first driving member, the control member of the second articulation being rotationally connected to the second driving member.

2. The system according to claim 1, in which the rest position of the maneuvering member is suitable for the maneuvering member not to interfere with the first and second driving members in said rest position.

3. The system according to claim 1, in which the maneuvering member is urged towards the rest position by at least one elastic member that is independent of the first and second articulations.

4. The system according to claim 1, in which the connecting bar passes through the control member of the second articulation at the rotational axis, without there being a rotational connection between said connecting bar and the control member of the second articulation.

5. The system according to claim 1, in which the first and second driving members are link rods extending approximately perpendicularly to the rotational axis and juxtaposed on said rotational axis.

6. The system according to claim 1, in which each of the first and second articulations has a tubular connector passing through the control member and secured to said control member by interlocking, the connecting bar being secured to the connector of the first articulation by interlocking and said connecting bar passing through the connector of the second articulation.

7. The system according to claim 6, in which the connector is made of plastic.

8. The system according to claim 6, in which the connectors of the first and second articulations are identical and each have a central through-passage of polygonal section, the connecting bar having at least:

a first portion having a corresponding polygonal section, which is interlocked in said central passage of the connector of the first articulation with a rotational connection,     and a second portion having a smaller section and passing through said central passage in the connector of the second articulation without a rotational connection.

9. The system according to claim 6, in which at least the connector of the second articulation has a tubular end piece that protrudes axially from the second articulation and is secured by interlocking to the second driving member.

10. The system according to claim 6, in which each of the first and second articulations has a central passage which passes through the two strength members of said articulation, the connector of said articulation having a flange which presses axially against one of the strength members of said articulation and elastic tabs which are clip-fastened onto the other strength member of said articulation.

11. A vehicle seat having a seat cushion and a backrest mounted such that it is pivotally mounted with respect to the seat cushion by an articulation system according to claim 1.

\* \* \* \* \*